(12) United States Patent
Sandström (10) Patent No.: US 10,626,056 B2
(45) Date of Patent: Apr. 21, 2020

(54) SUPER-HARD CONSTRUCTIONS, METHODS FOR MAKING SAME AND METHOD FOR PROCESSING SAME

(71) Applicant: Element Six Limited, County Clare (IE)

(72) Inventor: Karl Bernt-Ola Sandström, Robertsfors (SE)

(73) Assignee: Element Six Limited, County Clare (IE)

( * ) Notice: Subject to any disclaimer, the term of this patent is extended or adjusted under 35 U.S.C. 154(b) by 42 days.

(21) Appl. No.: 14/901,284

(22) PCT Filed: Jun. 25, 2014

(86) PCT No.: PCT/EP2014/063386
§ 371 (c)(1),
(2) Date: Dec. 28, 2015

(87) PCT Pub. No.: WO2015/000760
PCT Pub. Date: Jan. 8, 2015

(65) Prior Publication Data
US 2016/0214904 A1      Jul. 28, 2016

(30) Foreign Application Priority Data
Jul. 2, 2013   (GB) .................................. 1311849.2

(51) Int. Cl.
*C04B 35/52*      (2006.01)
*C04B 37/02*      (2006.01)
(Continued)

(52) U.S. Cl.
CPC .......... *C04B 35/52* (2013.01); *C04B 35/5831* (2013.01); *C04B 37/00* (2013.01);
(Continued)

(58) Field of Classification Search
None
See application file for complete search history.

(56) References Cited

U.S. PATENT DOCUMENTS

| 4,229,186 | A |   | 10/1980 | Wilson |
| 4,766,040 | A | * | 8/1988 | Hillert ................. B22F 7/06 |
|           |   |   |         | 419/11 |
| 5,009,673 | A |   | 4/1991 | Cho |
| 5,524,719 | A | * | 6/1996 | Dennis .................. E21B 10/567 |
|           |   |   |         | 175/432 |

(Continued)

FOREIGN PATENT DOCUMENTS

| EP | 0706981 A3 | 9/1996 |
| EP | 2354110 A3 | 11/2012 |

(Continued)

OTHER PUBLICATIONS

Search Report for GB1311849.2 dated Feb. 19, 2014, 6 pages.

(Continued)

*Primary Examiner* — Colleen P Dunn
*Assistant Examiner* — Ross J Christie
(74) *Attorney, Agent, or Firm* — Armstrong Teasdale LLP (57) ABSTRACT

A construction comprising a sintered polycrystalline super-hard layer having mutually opposite reinforced boundaries, each of which is bonded to a respective reinforcement structure, in which the super-hard layer includes polycrystalline diamond (PCD) material or polycrystalline cubic boron nitride (PCBN) material. The construction will be configured such that the equivalent circle diameter of each reinforced boundary is at least ten times the mean thickness of the super-hard layer between them. The reinforcement structures will be substantially free of material having a melting point of less than 2,000 degrees Celsius, at least adjacent the reinforced boundaries.

18 Claims, 2 Drawing Sheets

(51) Int. Cl.
*C22C 26/00* (2006.01)
*C04B 37/00* (2006.01)
*C04B 35/5831* (2006.01)
*B22F 7/06* (2006.01)

(52) U.S. Cl.
CPC ............ *C04B 37/021* (2013.01); *C22C 26/00* (2013.01); *B22F 7/062* (2013.01); *C04B 2237/361* (2013.01); *C04B 2237/363* (2013.01); *C04B 2237/76* (2013.01); *C22C 2204/00* (2013.01)

(56) References Cited

U.S. PATENT DOCUMENTS

| | | | |
|---|---|---|---|
| 5,766,394 A | 6/1998 | Anderson et al. | |
| 6,342,301 B1 * | 1/2002 | Yoshida | B01J 3/062 427/372.2 |
| 6,446,740 B2 | 9/2002 | Eyre | |
| 2001/0054332 A1 * | 12/2001 | Cheynet De Beaupre | B22F 7/06 76/108.1 |

FOREIGN PATENT DOCUMENTS

| | | | | |
|---|---|---|---|---|
| GB | 1083349 A | 4/1965 | | |
| GB | 2517569 B | 2/2015 | | |
| JP | 63202444 A | 8/1988 | | |
| JP | 63295482 A | 12/1988 | | |
| JP | 2004168554 A | 6/2004 | | |
| JP | 2004168555 A | 6/2004 | | |
| WO | WO 2006032982 A1 * | 3/2006 | ........... | C04B 35/624 |
| WO | 2008104946 A1 | 9/2008 | | |
| WO | 2009010934 A2 | 1/2009 | | |
| WO | 2011012708 A1 | 2/2011 | | |
| WO | 2012144502 A1 | 10/2012 | | |

OTHER PUBLICATIONS

Search Report for GB1411259.3 dated Dec. 18, 2014, 2 pages.
International Search Report for PCT/EP2014/063386 dated Sep. 23, 2014, 2 pages.
Notification of Grant of Patent for GB2517569 dated Sep. 15, 2015, 2 pages.

* cited by examiner

SUPER-HARD CONSTRUCTIONS, METHODS FOR MAKING SAME AND METHOD FOR PROCESSING SAME

CROSS-REFERENCE TO RELATED APPLICATIONS

This application is the U.S. national stage entry under 35 U.S.C. § 371 of PCT/EP2014/063386 filed on Jun. 25, 2014 which claims priority to GB 1311849.2 filed on Jul. 2, 2013, both of which are incorporated by reference in their entirety for all purposes.

This disclosure relates generally to relatively thin super-hard structures, constructions comprising them, and methods for making and processing them. The super-hard structures may particularly (but not exclusively) comprise polycrystalline diamond (PCD) material, polycrystalline cubic boron nitride (PCBN) material or silicon carbide-bonded diamond (SCD) material.

U.S. Pat. No. 4,229,186 discloses a laminated abrasive body comprising layers of sintered cubic boron nitride (cBN) grains joined by means of a layer of a metal, the thickness of the laminate exceeding 5 millimetres (mm) and the longest dimension of the body transverse to the thickness exceeding 2 millimetres (mm). A method for making the laminated abrasive is to produce the compacts while simultaneously producing the laminated body. This method includes forming alternate layers of cBN grains and metal having a melting point above 1,450 degrees Celsius in powder or foil form, subjecting the layers to elevated conditions of temperature and pressure suitable to form a sintered cBN compact.

United States patent application, publication number 2001/0054332 discloses flat composite cutting elements incorporating cBN material sandwiched between two refractory metal layers.

International patent application, publication number 2012/007429 discloses a method for making a layer for a construction such as an indexable insert for a machine tool. The method includes providing a precursor body comprising PCBN or PCD material, which may be in the form of a solid cylinder, and slicing the precursor to provide a plurality of discs and processing the discs by grinding, polishing or further cutting to achieve to provide the layer.

There is a need for relatively thin and robust super-hard structures, methods for making them relatively efficiently and methods of processing them and using them to make components for tools.

Viewed from a first aspect, there is provided a construction comprising a super-hard layer having mutually opposite reinforced boundaries, each of which is bonded to a respective reinforcement structure (the super-hard layer can be said to be "sandwiched" between a pair of reinforcement layers); configured such that the equivalent circle diameter of each reinforced boundary is at least ten times the mean thickness of the super-hard layer between them; the reinforcement structures being substantially free of material having a melting point of less than 2,000 degrees Celsius, at least adjacent the reinforced boundaries.

Various arrangements, variations and combinations envisaged by this disclosure for example constructions, non-limiting, non-exhaustive examples of which are described below.

In some example arrangements, the mean thickness of the super-hard layer may be at least 0.5 millimetres (mm) or at least 1 mm; and or the mean thickness of the layer may be at most 3 millimetres (mm), at most 2.5 mm or at most 2 mm.

In some example arrangements, the equivalent circle diameter of each of the reinforced boundaries may be at least 50 millimetres (mm); and or the equivalent circle diameter of each of the reinforced boundaries may be at most 120 millimetres (mm). In some examples, the super-hard layer may be in the form of a circular disc (in such examples, its equivalent circle diameter will be equal to its actual diameter).

Some example constructions may be configured such that the equivalent circle diameter of the reinforced boundaries is at least 20 times the mean thickness of the super-hard layer; and or the equivalent circle diameter of the reinforced boundaries may be at most 120 times the mean thickness of the super-hard layer.

In some example arrangements, the super-hard layer may comprise or consist of polycrystalline diamond (PCD) material or polycrystalline cubic boron nitride (PCBN) material.

In some example arrangements, each of the reinforcement structures may have a mean thickness of at least 0.1 millimetres (mm) or at least 0.5 mm; and or each of the reinforcement structures may have a mean thickness of at most 5 millimetres (mm) or at most 1 mm. In some examples, at least one of the reinforcement structures may be in the form circular disc; both reinforcement structures may be in the form of circular discs, which may have the same thickness or different thicknesses).

In some examples, at least one of the reinforcement structures may comprise molybdenum (Mo), niobium (Nb), tantalum (Ta), tungsten (W) and rhenium (Re) in elemental metallic form or included in an alloy, intermetallic material or a chemical compound. For example, the reinforcement structure may comprise molybdenum in elemental metallic form or included in an alloy, intermetallic material or a chemical compound.

In some example arrangements, at least one of the reinforcement structures may be chemically bonded to the super-hard layer by an intermediate layer comprising a chemical compound including carbon (C), boron (B) or nitrogen (N). For example, the strengthening structure may comprise molybdenum carbide, molybdenum nitride or molybdenum boride.

In some example arrangements, at least one of the reinforcement structures may comprise a first and second layer, the second layer being between the first layer and the super-hard layer, one boundary of the second layer being bonded to the super-hard layer and an opposite boundary of the second layer being bonded to the first layer. In some examples, the second layer may have arisen during the process of sintering the super-hard layer, as a result of chemical reaction between material from the super-hard grains and material comprised in the reinforcement layer prior to the sintering process, some of which may be present in the reinforcement structure comprised in an example construction. In some examples, the second layer may comprise carbide, nitride or boride chemical compound material including material of a kind comprised in the first layer comprised in the first layer and material from the super-hard grains.

In some examples, each reinforcement structure may be substantially free of a source of sinter promotion material for the super-hard layer, at least adjacent the respective reinforced boundary. In some examples, each of the reinforcement structures may be substantially free from a source of cobalt (Co), iron (Fe), nickel (Ni), manganese (Mn), aluminium (Al) or titanium (Ti) in a form in which it may react with the super-hard grains. In some examples, the super-hard layer may comprise diamond grains and the reinforcement structure may be substantially free of a source of cobalt (Co), iron (Fe), nickel (Ni), manganese (Mn) and or silicon (Si), at least adjacent the end surface. In some examples, the super-hard layer may comprise cBN grains and the reinforcement structure may be substantially free of aluminium (Al), titanium (Ti) and or cobalt (Co), at least adjacent the end surface.

In some examples, the reinforcement structures may have a mean Young's modulus of at least about 100 gigapascals (GPa), at least about 200 gigapascals (GPa) or at least about 300 gigapascals (GPa).

In some examples, the reinforcement structures may have a tensile strength of at least about 500 megapascals (MPa) at sea-level atmospheric pressure.

In some examples, the reinforcement structures may have a mean Vickers hardness of at least 1,000 megapascals (MPa) at sea-level atmospheric pressure.

In some examples, at least one of the reinforcement structures may be capable of being joined to a body by means of braze alloy material.

Viewed from a second aspect, there is provided a method of making a construction as claimed in any of the preceding claims, the method including:
providing an aggregation layer comprising a plurality of super-hard grains and a source of sinter promotion material, configured to have a pair of mutually opposite boundaries and a mean thickness between the boundaries, suitable for forming the super-hard layer to be comprised in the construction (taking into account the densification and chemical reactions that will likely take place during the sinter process);
providing at least two reinforcement structures, each having a contact area adjacent which the reinforcement structure is substantially free of material having a melting point of less than 2,000 degrees Celsius;
arranging a unit assembly such that the contact area of each of the reinforcement structures abuts a respective boundary of the aggregation layer and has an equivalent circle diameter of at least ten times the mean thickness of the super-hard layer to be comprised in the construction;
encapsulating the unit assembly within a capsule for an ultra-high pressure press apparatus to provide an encapsulated pre-sinter stack; and
subjecting the encapsulated pre-sinter stack to an ultra-high sinter pressure and sufficiently high sinter temperature and for a sufficient sinter period to form the construction (comprising the sintered polycrystalline super-hard layer bonded to the reinforcement structures at reinforced areas corresponding to the contact areas).

Various arrangements, combinations and variations of the method are envisaged by this disclosure, non-limiting and non-exhaustive examples of which are provided below.

In some examples, the equivalent circle diameter of each of the contact areas may be 50 to 120 millimetres (mm).

In some examples, the equivalent circle diameter of the contact areas may be 20 to 120 times the mean thickness of the super-hard layer to be comprised in the construction.

In some examples, the super-hard grains may comprise or consist of diamond material or cBN material, either of which may be in the form of single crystals or conglomerates of crystals.

In some examples, the super-hard grains may comprise or consist of cBN material and the source of sinter promotion material may comprise aluminium (Al), titanium (Ti), cobalt (Co) or nickel (Ni), or a combination including any of these, in elemental form or included in a chemical compound.

In some examples, the super-hard grains may comprise or consist of diamond material and the source of sinter promotion material may comprise or consist of cobalt (Co), iron (Fe), manganese (Mn), nickel (Ni) or silicon (Si), or a combination including any of these, in elemental form or included in a chemical compound.

In some examples, the boundaries of the aggregation layer and the contact areas of the reinforcement structures may be substantially circular.

In some examples, the thickness of the aggregation layer may not vary by more than 10 percent or by 5 percent throughout its volume.

In some examples, the aggregation layer may have a mean thickness of at least 1.0 millimetre (mm); and or the aggregation layer may have a mean thickness of at most 3.5 millimetres (mm).

In some examples, each of the reinforcement structures may have a mean thickness of at least 0.05 millimetres (mm) or at least 1 mm; and or each of the reinforcement structures may have a mean thickness of at most 5 millimetres (mm) or at most 4 mm.

In some examples, the reinforcement structures may comprise or consist of material that is capable of reacting with material from the super-hard grains and thus bonding chemically to them. In example constructions in which the aggregation layer comprises cBN grains, the reinforcement structure may comprise material capable of forming chemical bonds with boron and or nitrogen. In example constructions in which the aggregation layer comprises or consists of diamond grains, the reinforcement structures may comprise material capable of forming chemical bonds with carbon. For example, reinforcement structures comprising or consisting of molybdenum may be suitable for reinforcement super-hard layers comprising cBN and or diamond grains.

In some examples, the reinforcement structure may comprise or consist of refractory metal; and or the reinforcement structure may comprise or consist of metal alloy material, intermetallic material or ceramic material. In some examples, the reinforcement structures may comprise or consist of different materials.

In general, the reinforcement structure will likely be configured and comprise material such that it will be capable of reducing or eliminating substantial deformation, such as bending of the super-hard layer to which it is bonded, although some deformation may be tolerable, depending on the intended use and subsequent processing of the construction.

In some examples, at least one of the reinforcement structures may comprise or consist of molybdenum (Mo), niobium (Nb), tantalum (Ta), tungsten (W) and rhenium (Re) in elemental metallic form or included in an alloy, intermetallic material or a chemical compound.

In some examples, each reinforcement structure may be substantially free of a source of sinter promotion material for sintering the aggregation layer, at least adjacent the end surface; or the entire volume of each reinforcement structure may be free of sinter promotion material for sintering the aggregation layer.

In some examples, the aggregation layer may comprise diamond grains and the reinforcement structure may be substantially free of a source of cobalt (Co), iron (Fe), nickel (Ni), manganese (Mn) and silicon (Si), at least adjacent the end surface.

In some examples, the aggregation layer may comprise cBN grains and the reinforcement structure may be substantially free of aluminium (Al) and cobalt (Co), at least adjacent the end surface.

In some examples, the method may include encapsulating a plurality of unit assemblies to provide the pre-sinter stack; for example, the method may include encapsulating at least three or at least five unit assemblies to provide the pre-sinter stack.

In some examples, adjacent pairs of unit assemblies comprised in the pre-sinter stack may be separated by one or more separation structures configured and comprising material such that the adjacent pairs of unit assemblies will not substantially bond to each other as a result of being subjected to the sinter pressure and sinter temperature for the sinter period. The separation structures may be in the form of circular discs.

In some examples, at least one separation structure may comprise or consist of metal having a melting point of at least 2,000 degrees Celsius; a film comprising oxide of the metal may be present at a major surface of the separation structure. For example, at least one separation structure may comprise or consist of molybdenum and have a major surface at which a film comprising molybdenum oxide is present. The oxide film may cover substantially an entire major surface of one or more separation structure.

More generally, the method may include providing a structure comprising or consisting of refractory metal and being substantially free of material having a melting point of at less than 2,000 degrees Celsius, treating the structure to induce a chemical reaction at a surface of the structure to produce material that is chemically more inert than the metal, and using the structure as a separation structure. For example, the method may include subjecting a disc consisting of refractory metal to heat treatment in an oxygen-containing atmosphere at a sufficiently high temperature to result in a metal oxide film at the surface of the disc.

In some examples, at least one separation structure may comprise ceramic or mineral material, which may be in the form of an aggregation of ceramic fibres or mineral material fibres.

In some examples, the sinter pressure may be at least about 4 gigapascals (GPa), at least about 5 gigapascals or at least about 7 gigapascals (GPa). In some examples, the sinter temperature may be sufficiently high to melt at least one of the sources of sinter promotion material at the sinter pressure.

Viewed from a third aspect, there is provided a method of processing a construction according to this disclosure, the method including cutting the construction to provide a plurality of segments, each segment comprising a pair of segmented reinforcement structures bonded to opposite end boundaries of a segmented super-hard layer.

In some examples, the segments may have substantially the shape and dimensions of cutter elements suitable for indexable inserts for machining operations.

The method may include removing material from at least one of the segmented reinforcement structures, or complexly removing at least one of the reinforcement structures.

In some examples, the method may include attaching a segment to a tool body, the segment comprising at least one segmented reinforcement structure, by brazing the segmented reinforcement structure to the tool body. The method may include attaching a plurality of segments to a tool body for an indexable insert for a machine tool, each segment comprising at least one segmented reinforcement structure, by brazing each segmented reinforcement structure of the respective segments to respective pockets provided in the tool body.

Non-limiting example arrangements will be described below with reference to the accompanying drawings of which

Figure 1:
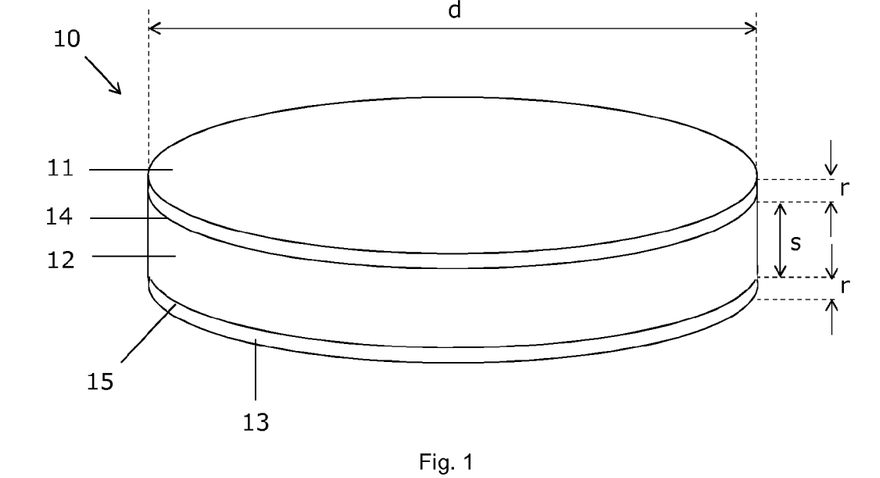
FIG. 1 shows a schematic perspective view of an example construction.

An aggregation layer may be provided in the form a circular disc having a pair of mutually opposite major boundaries, comprising a plurality of cBN grains and a source or plurality of sources of precursor material (sinter promotion material) for forming a binder matrix and bonding together the cBN grains in a sintered PCBN layer. Contact areas of reinforcement discs consisting of refractory metal, such as molybdenum (Mo), may be placed against each of the boundaries of the aggregation in an assembled capsule for an ultra-high pressure, high temperature press system. The capsule may then be subjected to an ultra-high sinter pressure of at least about 4.5 gigapascals (GPa) and a sinter temperature of about 1,300 degrees Celsius for a sufficient period to permit the binder material to form and to produce the PCBN layer, the major boundaries of which are bonded to the reinforcement discs. The construction may be thought of as a "sandwich" arrangement, in which a PCBN layer is bonded at opposite reinforced boundaries to a pair of reinforcement discs With reference to FIG. 1, an example sintered construction 10 comprising a PCBN layer 12 in the form of a circular disc and a pair of reinforcement discs 11, 13 bonded to mutually opposite reinforced boundaries 14, 15 of the PCBN layer 12. In this example, the reinforcement discs 11, 13 are each bonded to a respective reinforced boundary 14, 15 and comprise molybdenum and reaction products between molybdenum, the cBN grains and the sinter promotion material. The diameter d of the construction 10 may be about 70 millimetres (mm), the thickness s of the PCBN disc 12 may be about 1.6 millimetres (mm) and the thickness r of the end discs 11, 13 may be about 0.125 millimetres.

Figure 2:
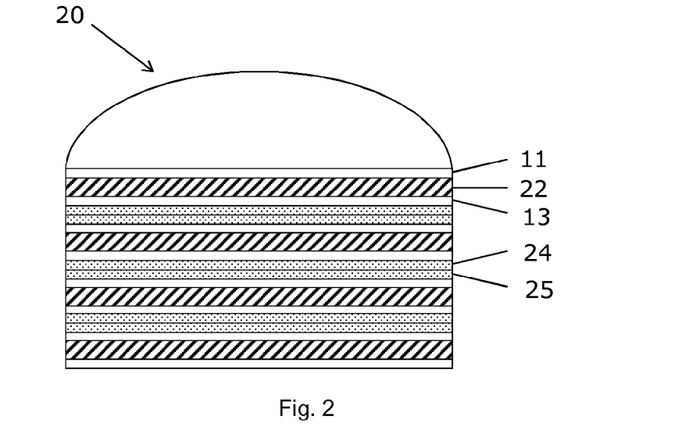
FIG. 2 shows a schematic axial (longitudinal) view through an example pre-sinter stack.

With reference to FIG. 2, an example pre-sinter stack 20 for assembling into a sinter capsule (not shown) may comprise a plurality of unit assemblies (four, in the particular example illustrated), each comprising an aggregation layer 22 in the form of a circular disc comprising super-hard grains and sinter promotion material, and contact areas of each of a pair of molybdenum discs 11, 13 contacting the aggregation layer 22 at opposite boundaries. In this example, the unit assemblies are may be stacked above one another, adjacent pairs being separated by two separator discs 24, 25, each comprising molybdenum and having a film of oxidised molybdenum on their surfaces. Stacking the layers will likely permit several PCBN layers to be sintered in a single ultra-high pressure, high temperature batch process and thus probably improving the economic viability of the manufacturing process. The oxidised films on the surfaces of the separator discs 24, 25 may assist in separating the sintered constructions after the sintering process.

The aggregation layer 22 may comprise a plurality of cBN grains and various source materials for forming the binder matrix of the sintered PCBN material. In some examples, the cBN grains may have a mean size of about 1 to about 10 microns and the source material may comprise titanium, aluminium or cobalt, each alone or in combination, in elemental or chemical compound form, as powder blended with the cBN grains.

Sintering the aggregation layer at the ultra-high pressure will likely increase its density by compaction and as a result in various chemical reactions and dissolution that will likely occur. Therefore, the thickness of the aggregation layer will generally need to be greater than the desired thickness of the sintered super-hard layer in order to take these effects into account. In general, the relationship between the thickness of the aggregation layer and the sintered PCBN layer can generally be found by trial and error experiments or it may be estimated by calculation.

Non-limiting example arrangements and methods are described below.

In one particular example, the super-hard layer may consist of PCBN material. The PCBN layer can be made by blending cBN grains with aluminium powder, the mass content of the cBN being 90 percent of the blended powders. The cBN grains may have a mean size in the range of 3 to 8 microns, as measured by laser diffractometric means. Aggregation layer comprising the cBN grains and aluminium powder can be prepared in the form of thin, compacted circular discs, having a thickness of about 1.8 millimetres (mm) and a diameter of about 50 millimetres (mm). The aggregation will generally need to be thicker than the desired thickness of the sintered PCBN layer owing to densification and chemical reactions involving the aluminium and the cBN grains during the sintering process. An aggregation layer can be made by filling a shallow mold with the blended powder, the mold having the desired depth and diameter of the aggregation layer, and compacting the blended powder to form a self-supporting green body. The green body can then be removed from the mold, placed in a furnace and heat threated in vacuum at a temperature of about 1,100 degrees Celsius to remove impurities from aggregation. After the heat treatment, the aggregation layer will likely have higher strength than the green body.

Pairs of reinforcement structures can be provided, in the form of circular discs consisting of molybdenum (Mo) and having substantially the same diameter as the aggregation layer, and having a thickness of 0.125 millimetres (mm). Contact areas of the reinforcement discs can be placed against respective circular boundaries the aggregation layer, thus "sandwiching" the aggregation layer between the reinforcement discs and forming a unit assembly. Several such unit assemblies can be prepared.

Separation discs can be prepared by providing molybdenum discs having substantially the same diameter as the aggregation layer and reinforcement discs, and a thickness of about 0.125 millimetres (mm). These discs can be heat threated in air in order for the separation discs to become coated with molybdenum oxide.

A stack of unit assemblies can be formed, in which at least two oxidised separation discs are located between adjacent unit assemblies. This will allow the sintered constructions, each comprising a PCBN layer and a pair of reinforcement discs bonded to reinforced boundaries of the PCBN layer, to be easily separated from each other after the process of sintering at ultra-high pressure. The stack may be encapsulated within a pair of opposite, interlocking cups comprising refractory metal to provide a pre-sinter assembly, which can then be assembled into a capsule for sintering PCBN material and subjected to a sinter pressure of at least about 4.5 gigapascals (GPa) and a sinter temperature of about 1,250 degrees Celsius for a sinter period of about 15 minutes. The pressure and temperature can then be reduced, the capsule removed from the press and the sintered constructions removed. Each construction will comprise PCBN layers bonded at opposite reinforced boundaries to pairs of reinforcement discs comprising molybdenum, molybdenum boride and or molybdenum nitride, the last two compounds arising from reaction between the reinforcement discs and the cBN grains. In some examples, chemical compounds including Mo, N, B and or Al may be present in the reinforcement discs. The constructions will likely be relatively easy to separate from each other owing to the presence of the oxidised molybdenum discs between them.

In other examples, the sinter pressure may be at least about 5 gigapascals (GPa), the sinter temperature may be about 1,650 degrees Celsius. In some examples, the sinter period may be in the range of about 15 to 50 minutes. In general, the sinter pressure will likely need to be increased if the sinter temperature is increased in order to achieve a condition at which cBN is thermodynamically more stable than the hexagonal cBN (hBN) allotrope.

In another example, aggregation layers comprising cBN grains blended with powder comprising $Al_3Ti$ material can be prepared. Aluminium powder and sub-stoichiometric titanium carbo-nitride powder (the sub-stoichiometry may be about 0.8) can be blended together in a desired mass ratio and the blended powder can be heated to about 1,025 degrees Celsius in a vacuum for a sufficient period for the powder to react chemically to form powder comprising $Al_3Ti$, chemical compounds including carbon and chemical compounds including nitrogen including nitrogen. The reacted powder can be crushed, sieved and then milled by means of an attrition mill for about 4 hours. The cBN grains can then be introduced into the milled powder and the combined powder can be further milled by means of an attrition mill for various periods up to a maximum of about 1 hour. The resulting slurry can be dried by means of a rotary evaporator to provide a pre-sinter powder blend. The pre-sinter powder blend can be compacted to provide a green body aggregation, which can be outgassed at 1,116 degrees Celsius to produce an aggregation disc. The diameter of the aggregation disc may be substantially the same as that desired for the sintered construction, which may be about 50 to about 100 millimetres (mm). The thickness of the aggregation disc will be sufficient to result in the sintered PCBN layer having the desired thickness, for example 1 millimetre, taking into account the densification of the aggregation owing to compaction at the ultra-high pressure and the chemical reactions likely to occur. The relationship between the thickness of the aggregation layer and the sintered PCBN layer can generally be found by trial and error experiments or it may be estimated by calculation.

PCBN material, in which the matrix comprises titanium carbide or titanium nitride can be made by a similar process as described above, including pre-reacting titanium carbide or titanium nitride, respectively, with aluminium.

In yet another particular example, the aggregation layer may comprise synthetic diamond grains having a mean size of 0.1 micron to 30 microns. The aggregation layer can be contained between a pair of molybdenum reinforcement discs, which will likely prevent sinter promotion material such as cobalt (Co) from infiltrating into he aggregation from a source external to the aggregation layer during the sinter process. Therefore, a source of the sinter promotion material may be included in the aggregation, which can be achieved by blending the diamond grains with fine Co powder or by other means, such as depositing the source of the Co onto the surfaces of the diamond grains. Various additives may also be included in the aggregation layer. For example, the aggregation layer may contain about 0.5 weight percent to about 5 weight percent of vanadium carbide, chromium carbide or tungsten carbide, or other element or compound that may have the effect of reducing or eliminating the risk of runaway grain growth (potentially of the kind known as Ostwald ripening). Such materials may be referred to as grain growth inhibitors.

In some versions of the example method, the aggregation layer may include metal carbonate precursor material, in particular metal carbonate crystals, and the method may include converting the precursor material to the corresponding metal oxide, typically by pyrolysis or decomposition, blending the metal oxide material with the diamond grains and milling the blended gains to produce finely divided metal oxide material dispersed over the surfaces of the diamond particles. The metal carbonate crystals may be selected from cobalt carbonate, nickel carbonate or carbonates of other materials capable of promoting the sintering of diamond grains. In this particular example, cobalt carbonate can be used. In some examples, the metal oxide precursor material may be milled until a mean grain size in the range from about 5 to about 200 nanometres (nm) is achieved. Once blended with the diamond grains, the metal oxide material may be reduced by heat treatment in vacuum in the presence of carbon to provide highly dispersed metal (the metal of the metal oxide). Alternatively or additionally, the metal oxide may be reduced in a hydrogen rich atmosphere. Controlled pyrolysis of a metal carbonate, such as cobalt carbonate crystals can provide a method for producing the corresponding metal oxide, for example cobalt oxide ($Co_3O_4$), which can be reduced to provide dispersed metallic cobalt.

Aggregation layers in the form of sheets can be provided, comprising a plurality of the diamond grains and source of sinter promotion material, such as cobalt, held together by a binder material, in which the diamond grains account for at least about 80 mass percent of the aggregation. The sheets can be made by various methods, such as by extrusion or tape casting methods, in which slurries comprising diamond grains and a binder material is spread onto a surface and allowed to dry. Other methods for making diamond-containing sheets may also be used, such as described in U.S. Pat. Nos. 5,766,394 and 6,446,740. Alternative methods for depositing diamond-bearing layers include spraying methods, such as thermal spraying. The binder material may comprise a water-based organic binder such as methyl cellulose or polyethylene glycol (PEG) and different sheets comprising diamond grains having different size distributions, diamond content or additives may be provided. The thickness of the sheets will be selected such that the sintered PCD material will be in the form of a layer having the desired thickness, for example about 2 millimetres (mm). Discs having the required diameter can be cut from the sheets and placed between pairs of Mo discs of the same diameter to provide several unit assemblies, stacked on top of each other with pairs of oxidised Mo separation discs between adjacent unit assemblies to provide a pre-sinter stack, and encapsulating the stack within a pair of opposing refractory cups to form a pre-sinter assembly. The cups should not be completely sealed so that gaseous material can escape from the pre-sinter assembly, which can be heated in a furnace to a temperature of several hundred degrees Celsius to burn off the binder material present in the aggregations. The cups may be compressed together and sealed after the heat treatment, assembled into a capsule for an ultra-high pressure press and subjected to an ultra-high sinter pressure of at least about 5.5 gigapascals (GPa) and a sufficiently high sinter temperature to melt the sinter promotion material. In this particular example, the sinter promotion material comprises cobalt and the sinter temperature may be at least about 1,300 degrees Celsius. After a suitable sinter period, for example at least 5 minutes, the pressure and temperature may be reduced, the capsule removed from the press and the sintered constructions comprising respective PCD layers bonded to pairs of reinforcement discs comprising molybdenum and molybdenum carbide, the latter arising from reaction between the reinforcement discs and the diamond grains. In some examples, chemical compounds including Mo, C and or Co may be present in the reinforcement discs. In some examples, the reinforcement discs comprised in the constructions may consist substantially of molybdenum carbide, potentially with a film of unreacted molybdenum present at the outer ends of the constructions. The constructions will likely be relatively easy to separate from each other owing to the presence of the oxidised molybdenum discs between them.

Refractory metal such as Mo will likely be capable of sustaining relatively high stress at the sinter temperature and thus have a reinforcing effect on the on the sintered super-hard layer as the temperature and pressure are reduced from the sinter conditions after the sinter process down to about atmospheric pressure and temperatures of less than a few hundred degrees Celsius, for example about 200 degrees Celsius. The presence of the reinforcement discs will likely permit some deformation of the super-hard layer whilst reducing the incidence of cracking, owing to the bonding of both reinforced surfaces to respective reinforcement structures. The cracking of the super-hard layer may be inhibited by the structural strength of the refractory material and by avoiding or reducing the presence of an exposed (non-reinforced) major surface of the super-hard layer. Examples of the disclosed method may have the aspect of permitting relatively thin super-hard layers to be sintered with an acceptable manufacturing yield.

In some examples, a thin film of sinter promotion material may be included in the unit assembly between a boundary of the aggregation layer and at least one of the reinforcement discs. In such examples, the aggregation layer may or may not include a source of sinter promotion material and the mass of sinter promotion material, such as cobalt, comprised in the film will be calculated to be just sufficient such that substantially all of it will infiltrate into the aggregation layer during the sinter process, leaving only a negligibly small amount of the material between the super-hard grains and the reinforcement discs, so that the latter will be capable of bonding with the super-hard grains comprised in the sintered polycrystalline super-hard layer.

A construction according to this disclosure may be further processed to provide a plurality of segments, which may be precursor elements for making tools. In particular, each construction may be cut into a plurality of segments in the general shape of layers for attachment to tool bodies for indexable machine tools. If the super-hard material and the material comprised in the reinforcement layer are capable of conducting an electrical current, the construction may be cut by means of electro-discharge machining (EDM) wire. If not, then the construction may be cut by means of a laser device, for example.

Owing to the reinforcement effect of the reinforcement layers, the risk of the super-hard layer cracking will likely be reduced substantially. Whilst wishing not to be bound by a particular theory, the bonding of substantially the entire end boundaries of the super-hard layer to the reinforcement layers will likely reduce the risk the formation of cracks at an exposed, unbounded surface. In addition, the use of strong, still reinforcement structures will likely reduce deformation, such as bending or bowing of the super-hard layer. A relatively minor degree of bending of the super-hard layer may be tolerable is a relatively large number of substantially smaller segments are to be cut from the construction, since the degree of bending in each segment may be negligibly small.

Each segment may be further processed, such as by grinding, to form a layer provided with a cutter edge, rake face and flank for use as par of an insert for a machine tool. One or both of the reinforcement layers may be removed. In some examples, the reinforcement layer on one side of the layer may be removed by grinding alone or in combination with other techniques, and the opposite reinforcement layer may be retained and brazed to a substrate body for the cutter insert, provided that the reinforcement layer comprises material capable of being brazed (in other words, capable of being wet by molten braze material and bonded to the braze material).

Figure 3:
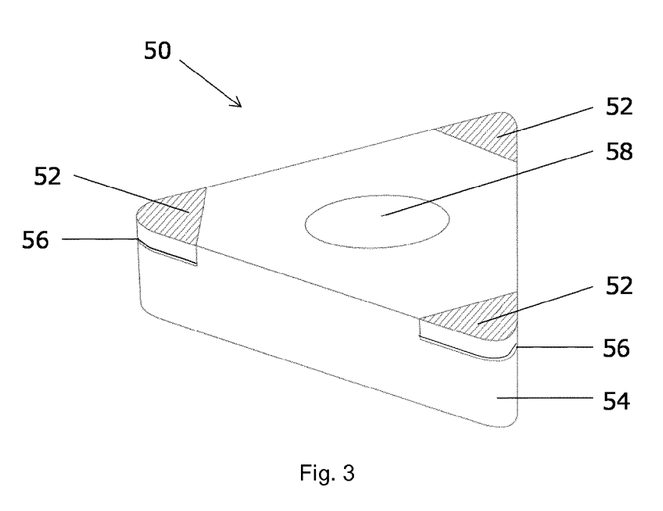
FIG. 3 shows a schematic drawing of an example indexable machine tool.

With reference to FIG. 3, an example indexable insert 50 for a turning machine tool (not shown) may comprise three cutter elements 52 comprising PCBN material and having at least one cutter edge, each joined to a cemented carbide substrate 54. Each cutter element 52 may be joined at respective pockets provided at respective corners of the substrate 54 by means of a layer 56 comprising braze material and a respective reinforcement layer still bonded to each cutter element 52.

In other examples, the cutting edges may be provided on corners of the same PCBN cutter element that extends along the entire peripheral edge of the substrate, and which may cover most of an end of the substrate. In some examples, PCBN cutter elements may be joined to both major ends of the substrate. In some examples, the cutter element or elements may comprise PCD.

In some examples, a portion of the reinforcement layer may be retained on the rake surface of each cutter element, which may have the aspect of enhancing the resistance of the cutter element to cracking or fracture, or may have another protective effect.

Certain terms and concepts as used herein are briefly explained below.

As used herein, the equivalent circle diameter of an area is the magnitude of the diameter of a circle having the same area. Using symbols, the equivalent circle diameter d of an area A is calculated as two times the square root of the quotient of A divided by $\pi$, or $d=2(A/\pi)^{1/2}$.

As used herein, a super-hard material has a Vickers hardness of at least about 28 gigapascals (GPa). Diamond, cubic boron nitride (cBN) and certain polycrystalline materials comprising diamond and or cBN are examples of super-hard materials.

As used herein, polycrystalline diamond (PCD) material comprises a plurality of diamond grains, a substantial number of which are directly inter-bonded with each other and in which the content of the diamond is at least about 80 volume percent of the material. Interstices between the diamond grains may be substantially empty or they may be at least partly filled with a filler material or they may be substantially empty. The filler material may comprise sinter promotion material.

PCBN material comprises grains of cubic boron nitride (cBN) dispersed within a matrix comprising metal, semi-metal and or ceramic material. For example, PCBN material may comprise at least about 30 volume percent cBN grains dispersed in a binder matrix material comprising a Ti-containing compound, such as titanium carbonitride and or an Al-containing compound, such as aluminium nitride, and or compounds containing metal such as Co and or W. Some versions (or "grades") of PCBN material may comprise at least about 80 volume percent or even at least about 85 volume percent cBN grains.

As used herein, sinter promotion material will be capable of promoting the sintering of an aggregation containing super-hard grains. As an example, the direct inter-growth of adjacent diamond grains (that is to say, the formation of a diamond "neck" connecting adjacent diamond grains) may be promoted by the presence of iron (Fe), nickel (Ni), cobalt (Co) or manganese (Mn), or alloys comprising one or more of these (for example, a mixture of cobalt and iron or of iron and nickel), which may also be referred to as "solvent/catalyst" material for diamond. As another example, certain materials in elemental or chemical compound form may react chemically with material comprised in cBN grains to promote the formation of PCBN material. More generally, the presence of sinter promotion material for cBN (or PCBN) will enable certain chemical reactions or interactions to occur to produce a matrix by which the cBN grains are held together. The matrix will likely include the sinter promotion material in its original form or included in chemical compounds.

As used herein, refractory metals (which includes certain alloys) have a melting point temperatures of greater than 2,000 degrees Celsius. Refractory metal will likely display relative stability against creep deformation at very high temperatures (when in the solid state, below the melting point). For example, refractory metals include molybdenum (Mo), niobium (Nb), tantalum (Ta), tungsten (W) and rhenium (Re) and certain alloys including one or more of these elements. More generally, refractory materials include refractory metals and certain advanced ceramic materials. For example, material comprising or consisting of a carbide, nitride or boride of any of the refractory metals.

A machine tool is a powered mechanical device, which may be used to manufacture components comprising materials such as metal, composite materials, wood or polymers by machining. Machining is the selective removal of material from a body or a workpiece. A rotary machine tool is a machine tool comprising a cutter element, for example a drill bit, which rotates about its own axis in use.

As used herein, the term "consists of" does not exclude the possibility that insubstantial amounts of practically unavoidable impurities may be present.

The invention claimed is:
1. A construction comprising:
 a sintered polycrystalline super-hard layer having a mean thickness of 0.5 to 3 mm, and comprising mutually opposite reinforced boundaries, each of which is bonded to a respective reinforcement structure having a thickness of at least 0.5 mm;
 wherein the super-hard layer comprises polycrystalline diamond (PCD) material or polycrystalline cubic boron nitride (PCBN) material;
 the construction configured such that an equivalent circle diameter of each reinforced boundary is at least ten times a mean thickness of the super-hard layer between them; and
 the reinforcement structures being substantially free of material with a melting point of less than 2,000 degrees Celsius, at least adjacent the reinforced boundaries; and
 at least one of the reinforcement structures comprises any of molybdenum (Mo), niobium (Nb), tantalum (Ta), tungsten (W) and rhenium (Re) in any of elemental metallic form, alloy form, intermetallic material or a chemical compound.

2. The construction as claimed in claim 1, in which each of the reinforcement structures has a mean thickness of up to 5 millimeters (mm).

3. The construction as claimed in claim 1, in which each reinforcement structure is substantially free of sinter promotion material for the super-hard layer, at least adjacent the respective reinforced boundary.

4. The construction as claimed in claim 1, in which each of the reinforcement structures has a mean Young's modulus of at least 250 gigapascals (GPa) or a tensile strength of at least 500 megapascals (MPa).

5. A method of making the construction as claimed in claim 1, the method comprising:
   providing an aggregation layer comprising a plurality of super-hard grains and a source of sinter promotion material, configured to have a pair of mutually opposite boundaries and a mean thickness between the boundaries, suitable for forming the super-hard layer to be comprised in the construction;
   providing at least two reinforcement structures, each structure comprising a contact area adjacent which the reinforcement structure is substantially free of material having a melting point of less than 2,000 degrees Celsius;
   wherein at least one of the reinforcement structures comprises any of molybdenum (Mo), niobium (Nb), tantalum (Ta), tungsten (W) and rhenium (Re) in any of elemental metallic form, alloy form, intermetallic material or a chemical compound;
   arranging a unit assembly such that the contact area of each of the reinforcement structures abuts a respective boundary of the aggregation layer and has an equivalent circle diameter of at least ten times the mean thickness of the super-hard layer to be comprised in the construction;
   encapsulating the unit assembly within a capsule for an ultra-high pressure press apparatus to provide an encapsulated pre-sinter stack; and
   subjecting the encapsulated pre-sinter stack to an ultra-high sinter pressure and sufficiently high sinter temperature and for a sufficient sinter period to form the construction.

6. The method as claimed in claim 5, the equivalent circle diameter of each of the contact areas is 20 to 120 times the mean thickness of the super-hard layer to be comprised in the construction.

7. The method as claimed in claim 5, in which the super-hard grains comprise cubic boron nitride (cBN) material and the source of sinter promotion material comprises aluminium (Al), titanium (Ti), cobalt (Co) or nickel (Ni), or a combination thereof, in elemental form or included in a chemical compound.

8. The method as claimed in claim 5, in which the super-hard grains comprise diamond material and the source of sinter promotion material comprises cobalt (Co), iron (Fe), manganese (Mn), nickel (Ni) or silicon (Si), or a combination thereof, in elemental form or included in a chemical compound.

9. The method as claimed in claim 5, in which the thickness of the aggregation layer between the boundaries does not vary by more than 10 percent.

10. The method as claimed in claim 5, in which the aggregation layer has a mean thickness between the boundaries of from 1.0 to 3.5 millimeters (mm).

11. The method as claimed in claim 5, in which each of the reinforcement structures has a mean thickness of from 0.05 to 5 millimeters.

12. The method as claimed in claim 5, in which each of the reinforcement structures is substantially free of a source of sinter promotion material for sintering the aggregation layer, at least adjacent an end surface.

13. The method as claimed in claim 5, in which the aggregation layer comprises cBN grains and each of the reinforcement structures is substantially free of aluminium (Al) and cobalt (Co), at least adjacent an end surface.

14. The method as claimed in claim 5, further comprising encapsulating a plurality of unit assemblies to provide the pre-sinter stack.

15. The method as claimed in claim 14, in which adjacent pairs of unit assemblies are separated by a separation structure configured and comprising material such that the adjacent pairs of unit assemblies will not substantially bond to each other responsive to being subjected to the sinter pressure and sinter temperature for the sinter period.

16. The method as claimed in claim 14, in which the separation structure comprises a refractory metal coated with a film comprising oxide of the metal, molybdenum coated with a film comprising molybdenum oxide, or both.

17. The method as claimed in claim 14 further comprising
   providing a structure comprising metal and being substantially free of material having a melting point of at less than 2,000 degrees Celsius,
   treating the structure to induce a chemical reaction at a surface of the structure to produce material that is chemically more inert than the metal, and
   using the structure as a separation structure.

18. The method of processing a construction as claimed in claim 1, the method comprising
   cutting the construction to provide a plurality of segments, wherein each segment comprises a pair of segmented reinforcement structures bonded to opposite end boundaries of a segmented super-hard layer.

* * * * *